(12) United States Patent
Vargantwar et al.

(10) Patent No.: US 8,331,327 B1
(45) Date of Patent: Dec. 11, 2012

(54) DYNAMIC WIRELESS NETWORK REGISTRATION WINDOW

(75) Inventors: Sachin R. Vargantwar, Overland Park, KS (US); Debasish Sarkar, Irvine, CA (US); Siddharth S. Oroskar, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 543 days.

(21) Appl. No.: 12/535,346

(22) Filed: Aug. 4, 2009

(51) Int. Cl.
*H04W 4/00* (2009.01)
(52) U.S. Cl. .......................... 370/332; 370/329
(58) Field of Classification Search .......... 370/330, 370/252; 455/435, 435.1, 436, 550, 63
See application file for complete search history.

(56) References Cited

U.S. PATENT DOCUMENTS

| | | | |
|---|---|---|---|
| 6,356,755 B1 * | 3/2002 | Valentine et al. | 455/435.1 |
| 6,445,728 B1 | 9/2002 | Byun | |
| 6,456,826 B1 * | 9/2002 | Toskala et al. | 455/63.1 |
| 6,738,438 B2 | 5/2004 | Rick et al. | |
| 2002/0107021 A1 * | 8/2002 | Ishikawa et al. | 455/436 |
| 2009/0017863 A1 * | 1/2009 | Rowley et al. | 455/550.1 |
| 2010/0075680 A1 * | 3/2010 | Ramachandran et al. | 455/436 |
| 2010/0304745 A1 * | 12/2010 | Patel et al. | 455/435.1 |
| 2010/0329132 A1 * | 12/2010 | Raghothaman et al. | 370/252 |
| 2011/0188466 A1 * | 8/2011 | Zhang et al. | 370/330 |

* cited by examiner

*Primary Examiner* — Andrew Lai
*Assistant Examiner* — Syed M Bokhari (57) ABSTRACT

What is disclosed is a method of operating a wireless access node, where the wireless access node provides a wireless communication service to wireless communication devices after registration. The method includes monitoring a wireless access channel of the wireless access node for registration attempts of the wireless communication devices during a first time period and detecting a threshold amount of noise occurring on the wireless access channel after the first time period. The method also includes, in response to detecting the threshold amount of noise, processing the first time period and data related to the threshold amount of noise to determine a second time period. The method also includes, in response to determining the second time period, monitoring the access channel for additional registration attempts of the wireless communication devices during the second time period.

20 Claims, 6 Drawing Sheets

---

MONITOR A WIRELESS ACCESS CHANNEL OF A WIRELESS ACCESS NODE FOR REGISTRATION ATTEMPTS OF WIRELESS COMMUNICATION DEVICES DURING A FIRST TIME PERIOD
201

DETECT A THRESHOLD AMOUNT OF NOISE OCCURRING ON THE WIRELESS ACCESS CHANNEL AFTER THE FIRST TIME PERIOD
202

IN RESPONSE TO DETECTING A THRESHOLD AMOUNT OF NOISE, PROCESS THE FIRST TIME PERIOD AND DATA RELATED TO THE THRESHOLD AMOUNT OF NOISE TO DETERMINE A SECOND TIME PERIOD
203

IN RESPONSE TO DETERMINING THE SECOND TIME PERIOD, MONITOR THE WIRELESS ACCESS CHANNEL FOR ADDITIONAL REGISTRATION ATTEMPTS OF THE WIRELESS COMMUNICATION DEVICES DURING THE SECOND TIME PERIOD
204

DYNAMIC WIRELESS NETWORK REGISTRATION WINDOW

TECHNICAL FIELD

Aspects of the disclosure are related to the field of communications, and in particular, wireless communication protocols in wireless communication networks.

TECHNICAL BACKGROUND

Wireless communication networks typically include wireless access nodes which exchange communications between wireless communication devices and further communication networks and systems. In many examples, prior to gaining access through the wireless access node, wireless communication devices must complete a registration process with the wireless access node over a wireless link. This registration process can include the exchange of overhead communications to identify the wireless communication device as well as to establish parameters related to further exchange of user communications over the wireless link.

However, many examples of wireless communication protocols used to communicate between wireless communication devices and wireless access nodes have fixed periods of time during which certain overhead and registration communications must occur. In many examples, if the correct registration or overhead communications do not occur during these pre-defined periods of time, wireless communication devices can be denied access through the wireless access node and resources can be wasted by wireless communication devices repeatedly attempting the registration process.

OVERVIEW

What is disclosed is a method of operating a wireless access node, where the wireless access node provides a wireless communication service to wireless communication devices after registration. The method includes monitoring a wireless access channel of the wireless access node for registration attempts of the wireless communication devices during a first time period and detecting a threshold amount of noise occurring on the wireless access channel after the first time period. The method also includes, in response to detecting the threshold amount of noise, processing the first time period and data related to the threshold amount of noise to determine a second time period. The method also includes, in response to determining the second time period, monitoring the access channel for additional registration attempts of the wireless communication devices during the second time period.

What is also disclosed is a wireless access node, where the wireless access node provides a wireless communication service to wireless communication devices after registration. The wireless access node includes a transceiver configured to monitor a wireless access channel of the wireless access node for registration attempts of the wireless communication devices during a first time period and detect a threshold amount of noise occurring on the wireless access channel after the first time period. The wireless access node also includes, in response to detecting the threshold amount of noise, a processing system configured to process the first time period and data related to the threshold amount of noise to determine a second time period. In response to determining the second time period, the transceiver is also configured to monitor the access channel for additional registration attempts of the wireless communication devices during the second time period.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
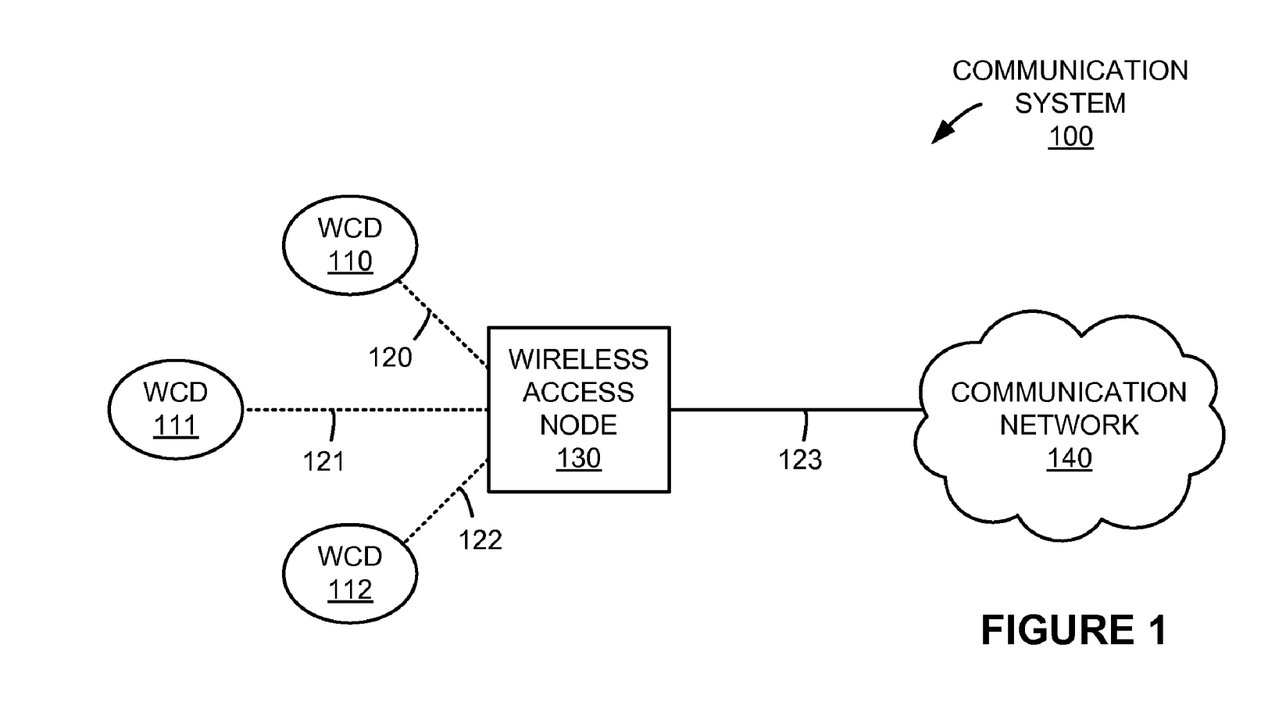
FIG. 1 is a system diagram illustrating a communication system.

FIG. 1 is a system diagram illustrating communication system 100. Communication system 100 includes wireless communication devices (WCD) 110-112, wireless access node 130, and communication network 140. Wireless communication devices 110-112 communicate with wireless access node 130 over wireless links 120-122, respectively. Wireless access node 130 and communication network 140 communicate over link 123.

In FIG. 1, wireless access node 130 can provide wireless communication service to each of wireless communication devices 110-112 over wireless links 120-122, respectively. In typical examples, wireless communication devices 110-112 must each complete a registration process prior to wireless access node 130 providing wireless communication services. Wireless access node 130 also has at least one associated wireless access channel in this example. The wireless access channel is used by each of wireless communication devices 110-112 when attempting to register for wireless communication service with wireless access node 130. The wireless access channel could be shared by each of wireless communication devices 110-112 through a shared portion of wireless links 120-122, or could be a separate wireless access channel and associated with each of wireless links 120-122.

Figure 2:
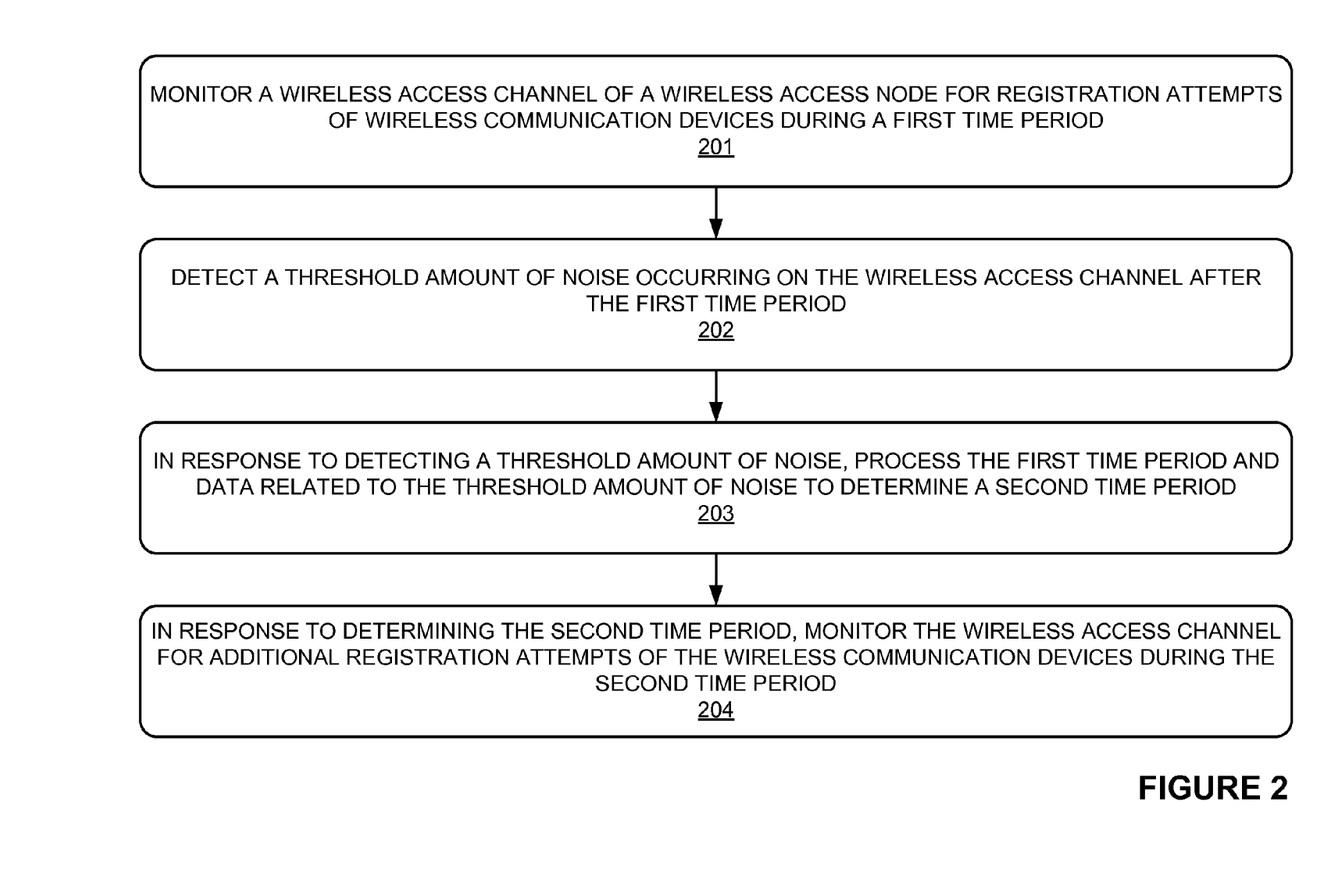
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless access node 130 monitors (201) a wireless access channel of wireless access node 130 for registration attempts of wireless communication devices 110-112 during a first time period. Wireless access node 130 detects (202) a threshold amount of noise occurring on the wireless access channel after the first time period, and in response to detecting the threshold amount of noise, wireless access node 130 processes (203) the first time period and data related to the threshold amount of noise to determine a second time period. In response to determining the second time period, wireless access node 130 monitors (204) the wireless access channel for additional registration attempts of wireless communication devices 110-112 during the second time period. In further examples, after an individual wireless communication device has completed the registration process, user communications can be exchanged between the wireless communication device and wireless access node 130.

Referring back to FIG. 1, wireless communication devices (WCD) 110-112 each comprise radio frequency (RF) communication circuitry and an antenna. The RF communication circuitry typically includes amplifiers, filters, modulators, and signal processing circuitry. In many examples, wireless communication devices 110-112 each include circuitry and equipment to register for wireless communication service with wireless access node 130 over a wireless link. Wireless communication devices 110-112 may also each include a user interface, memory device, computer-readable storage medium, software, processing circuitry, or some other communication components. Wireless communication devices 110-112 may each be a telephone, mobile wireless telephone, computer, e-book, mobile Internet appliance, wireless network interface card, media player, game console, or some other wireless communication apparatus, including combinations thereof. Although three wireless communication devices are shown in FIG. 1, it should be understood that a different number of wireless communication devices could be included.

Wireless access node 130 comprises RF communication and control circuitry and an antenna. The RF communication circuitry typically includes amplifiers, filters, RF modulators, and signal processing circuitry. In many examples, wireless access node 130 includes equipment to monitor a wireless access channel for registration attempts of wireless communication devices 110-112, provide wireless communication service to wireless communication devices 110-112 after registration, and route user communications between communication network 140 and wireless communication devices 110-112. Wireless access node 130 may also comprise a router, server, memory device, software, processing circuitry, cabling, power supply, network communication interface, physical structural support, or some other communication apparatus. Wireless access node 130 could be a base station, base transceiver station, Internet access node, telephony service node, wireless data access point, or some other wireless communication system, including combinations thereof. In typical examples, wireless access node 130 has a limited geographic coverage area over which it can provide communication services to wireless communication devices.

Communication network 140 comprises the core network of a wireless communications provider, and could include routers, gateways, telecommunication switches, processing systems, or other communications equipment and systems for providing communication and data services. Communication network 140 may also comprise optical networks, asynchronous transfer mode (ATM) networks, packet networks, metropolitan-area networks (MAN), or other network topologies, equipment, or systems, including combinations thereof. In some examples, communication network 140 includes further wireless access nodes and associated equipment for providing communication services to many wireless communication devices across a geographic region.

Wireless links 120-122 each use the air or space as the transport media. Wireless links 120-122 may each use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication link 123 uses metal, glass, optical, air, space, or some other material as the transport media. Communication link 123 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 120-123 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication link 123 could be a direct link or may include intermediate networks, systems, or devices. In many examples, the portion of wireless links 120-122 as transmitted by the associated wireless communication device is referred to an uplink or reverse link of the wireless link, while the portion as transmitted by wireless access node 130 is referred to as a downlink or forward link of the wireless link.

Figure 3:
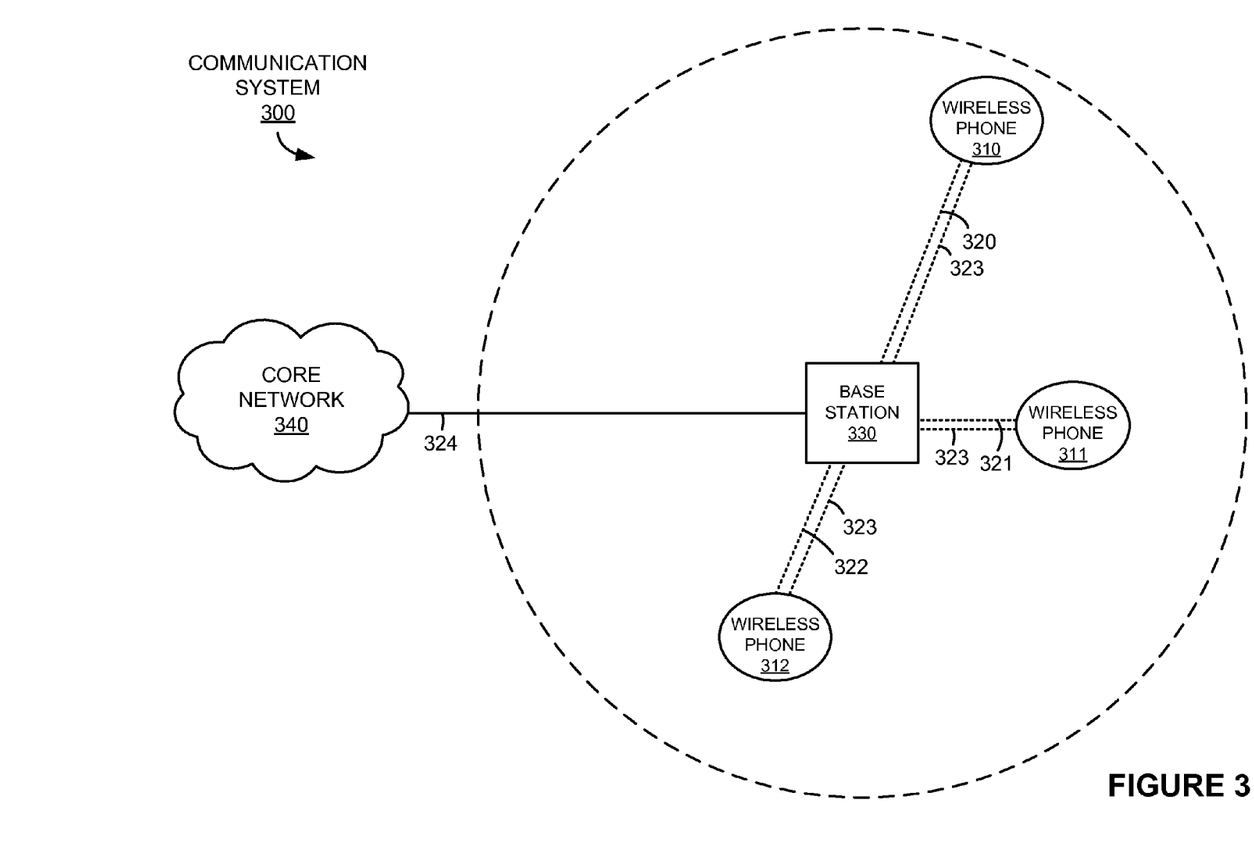
FIG. 3 is a system diagram illustrating a communication system.

FIG. 3 is a system diagram illustrating communication system 300. Communication system 300 includes wireless phones 310-312, base station 330, and core network 340. Wireless phones 310-312 communicate with base station 330 over wireless links 320-322, respectively. Wireless phones 310-312 can also communicate with base station 330 over shared wireless access channel 323. Base station 330 and core network 340 communicate over link 324.

Wireless phones 310-312 are user devices, and comprise mobile wireless telephones in this example. Although three wireless phones are shown in FIG. 3, it should be understood that a different number of wireless phones or other wireless communication devices could be included. Base station 330 comprises RF communication and control circuitry and an antenna, and includes wireless communications equipment capable of communicating with and providing communication service to wireless phones 310-312. Core network 340 is a core network of a wireless communications provider in this example. Core network 340 could include further base stations, routers, gateways, controller systems, processing systems, or other communication equipment. Wireless links 320-323 employ the CDMA wireless protocol, and link 324 is a T1 link in this example. In this example, wireless links 320-322 are each used to exchange at least user communications, and wireless link 323 is used to at least exchange registration communications.

Figure 4:
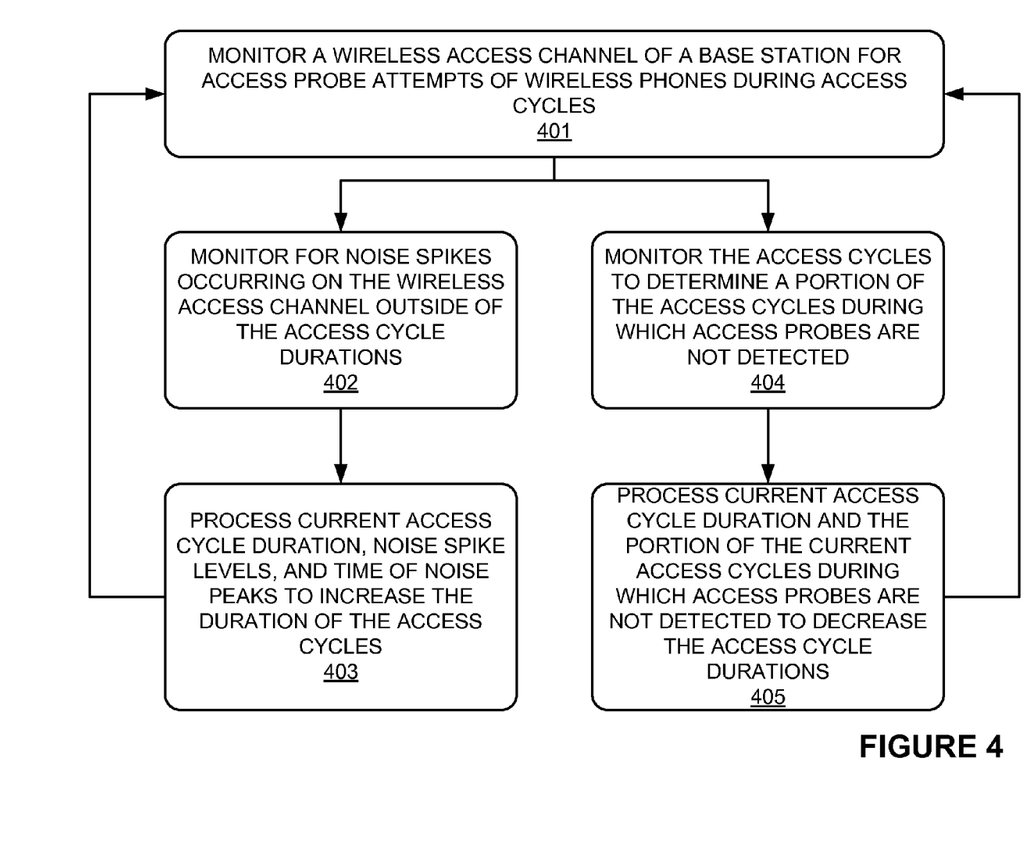
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, base station 330 monitors (401) wireless access channel 323 of base station 330 for access probe attempts of wireless phones 310-312 during access cycles of wireless access channel 323. In FIG. 3, base station 330 can provide wireless communication service to each of wireless phones 310-312 over wireless links 320-322, respectively. In typical examples, wireless phones 310-312 must each complete a registration process prior to base station 330 providing wireless communication services thereto.

To facilitate the registration of wireless phones, base station 330 has at least one associated wireless access channel in this example, namely wireless access channel 323. Wireless access channel 323 is used by each of wireless phones 310-312 when attempting to register for wireless communication service with base station 330. Wireless access channel 323 is also typically used by wireless phones 310-312 to transfer overhead communications to base station 330. These overhead communications can include access probes, text messaging, call origination messages, or other types of overhead communications. In this example, wireless access channel 323 is shared by each of wireless phones 310-312 through a shared portion of wireless links 320-322, as represented in FIG. 3 as wireless access channel 323 between each wireless phone 310-312 and base station 330. Also in this example, wireless access channel 323 has access cycles associated therewith. These access cycles are recurring periods of time during which base station 330 monitors wireless access channel 323 for access attempts of wireless phones 310-312. In this example, the access attempts of wireless phones 310-312 are referred to as access probes.

An access probe typically includes messages transferred on wireless access channel 323 from any one of wireless phones 310-312 to base station 330 to identify the wireless phone and to start a registration process for communication services through base station 330. The registration process can occur during an initial entry into the coverage area of base station 330, in some examples. In other examples, the registration process occurs when a new communication session is desired by one of wireless phones 310-312. These messages transferred on wireless access channel 323 are contained in short bursts of data and typically referred to as access probes. Base station 330 only monitors for access probes during predefined periods of time on wireless access channel 323, namely during access cycles. Once an access probe is detected and processed by base station 330, a response to the access probe is transferred to the individual wireless phone associated with the access probe, furthering the registration process. However, if a wireless phone does not receive a response to a previously transferred access probe within a certain period of time, the wireless phone will typically re-transfer another access probe to base station 330, but at a higher transmit power. Many times a wireless phone will re-transfer the access probe after a short delay. This process of re-transferring an access probe at a higher power can repeat until a maximum number of access probe retries, or until a response to the access probe is received by the individual wireless phone.

Unfortunately, due to wireless signal transit times of the access probes transferred by wireless phones 310-312, distances of wireless phone 310-312 from base station 330, RF conditions around wireless phones 310-312 and base station 330, or other factors, access probes may not be detected by base station 330 during an access cycle. Additionally, when multiple wireless phones are transferring access probes simultaneously, the possibility exists that two or more access probes will overlap in arrival time at base station 330, making it difficult for base station 330 to determine the content and originators of the overlapping access probes. This can lead to re-transmission of the access probes by the affected wireless phones, typically at a higher transmit power, and to a commensurately higher level of RF noise as detected by base station 330 and wireless phones 310-312.

Base station 330 monitors (402) for noise spikes occurring on wireless access channel 323 outside of the recurring access cycle durations. Since, as discussed above, base station 330 does not monitor for access probes outside of the access cycles, if a wireless phone transferred an access probe during the period of time outside of the access cycle, base station 330 would not respond thereto. Also, as discussed above, this could lead to the wireless phone re-transmitting the access probe at a higher power level at a later time. When an access probe or multiple access probes occur on wireless access channel 323 outside of the access cycle, base station 330 may interpret this occurrence as an increase in noise on the access channel. This increase in noise may appear to base station 330 as a short-term rise in the noise level of the access channel, such as a reverse noise rise (RNR), noise spike, a noise peak, an increase in a noise floor, a decrease in a signal-to-noise ratio (SNR), or other manifestation. These noise increases could interfere with other overhead communications occurring outside of the access cycle on wireless access channel 323 in some examples.

Base station 330 the processes (403) the current access cycle duration, the amplitude or level of noise spikes occurring outside of the access cycles, and the time of the noise spikes to increase the duration of the recurring access cycles. In typical examples, base station 330 processes data related to the noise increases outside of the access cycles to determine that access probes are occurring before or after the current access cycles. These data can include the amplitude of the noise increases, peak levels of noise spikes, a relative time of occurrence of the noise increases as compared to the current access cycle, a reverse noise rise (RNR), or other data. Additionally, base station 330 could detect actual access probes which are received outside of current access cycles. Base station 330 could then increase the duration of the access cycles to capture additional access probes transferred by wireless phones 310-312, as represented by the noise spikes occurring outside of the original access cycle durations.

Base station 330 monitors (404) the access cycles of wireless access channel 323 to determine a portion of the access cycles during which access probes are not detected. Base station 330 then processes (405) the current access cycle duration and the portion of the current access cycles during which access probes are not detected to decrease the access cycle durations. Decreasing the access cycle durations could free up communication resources or processing power of base station 330 for other overhead communications with wireless phones. As mentioned above, wireless signal transit times of the access probes transferred by wireless phones 310-312 or distances of wireless phone 310-312 from base station 330 may impact the ability of base station 330 to properly receive access probes during access cycles. In many examples, the initial duration of access cycles is determined by a wireless coverage area radius, such as illustrated in FIG. 3 by the circular coverage area. In other examples, base station 330 handles communications for a smaller portion of a circular coverage area, such as a sector, and the sector size could determine the initial access cycle duration to limit the distances over which wireless phones can successfully transfer access probes.

During operation, if the duration of the access cycles becomes too long, resources of access channel 323 are wasted waiting for access probes that may never arrive. The portion of the access cycles during which access probes are not received could be eliminated to reduce the duration of the access cycles. Additionally, if the access cycle becomes too long, base station 330 must process additional portions of access channel 323 to detect the access probes. This increase in processing of access channel 323 can lead to a increase in processor or CPU utilization of base station 330. Advantageously, by decreasing the durations of the access cycles, base station 330 enables a more efficient use of access channel 323, and more resources for wireless phones 310-312 to transfer other overhead communications on access channel 323.

In the above examples, base station 330 could also monitor the access cycles and portions of wireless access channel 323 outside of the access cycles for a duration encompassing many access cycles to determine the increased or decreased access cycles durations. Advantageously, this monitoring over a longer duration could limit spurious signals, noise from sources other than access probes, or short-term changes in access probe activity from affecting changes to the access cycle durations. Thus, base station 330 could process the present conditions, such as noise increases, access probe occurrences, as well as other factors, of access channel 323 to optimize the durations of access cycles by increasing or decreasing the durations of the access cycles.

Furthermore, a noise increase as detected by base station 330 could be utilized to alter the dormancy timer associated with wireless phones 310-312. A dormancy timer includes a limit or duration of time that a wireless phone should be kept in an active registration state with base station 330, even though the wireless phone may not be presently exchanging user communications with base station 330. While in the active registration state, wireless phones and base station 330, in typical examples, exchange frequent overhead communications. These overhead communications can impact the noise level as detected by base station 330, especially in congested scenarios when many wireless phones are in an active registration state, or when many overhead communications are being exchanged. In response to a noise rise as detected by base station 330 above a certain threshold level, base station 330 could reduce the dormancy timer for wireless phones 310-312. In some examples, the noise rise is a reverse noise rise (RNR) caused overhead communications transferred by wireless phones while in an active registration state. The reduced dormancy timer duration could then allow wireless phones to transition to an inactive state upon the expiration of the dormancy timers if user communications are not being presently exchanged with base station 330. Advantageously, by having a shorter dormancy timer when the RNR is above a certain threshold level, the total level of overhead communications associated with wireless phones in an active registration state can be reduced. Thus, the RNR associated with overhead communications of phones whose dormancy timers have expired and subsequently transitioned to an inactive state can be eliminated from the total RNR as detected by base station 330. In typical examples, base station 330 transfers the decreased dormancy timer values to wireless phones in communication with base station 330. It should be understood that although the dormancy timer is decreased in the above example, the dormancy timer could be increased as well.

Figure 5:
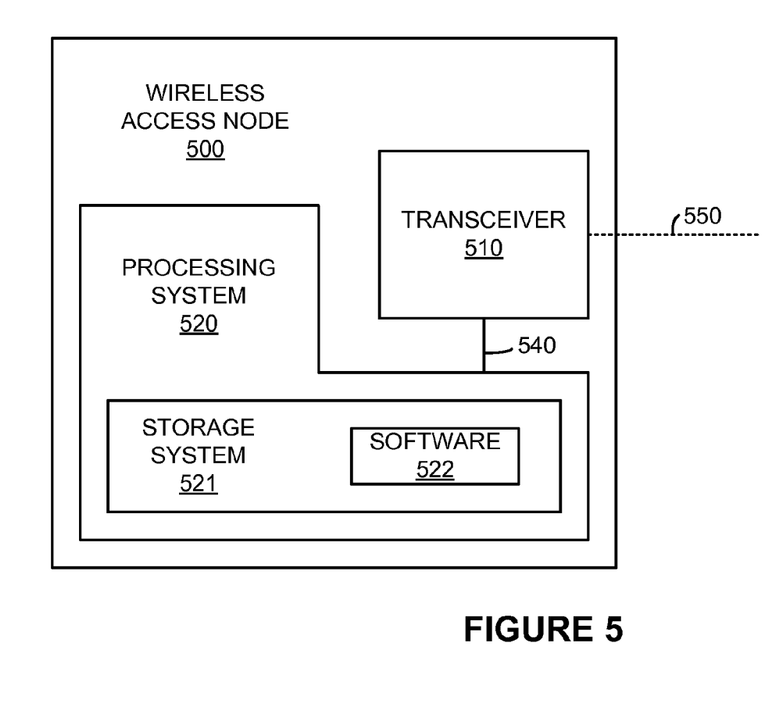
FIG. 5 is a block diagram illustrating a wireless access node.

FIG. 5 is a block diagram illustrating wireless access node 500, as an example of wireless access node 130 found in FIG. 1 or base station 330 found in FIG. 3, although wireless access node 130 or base station 330 could use other configurations. Wireless access node 500 includes transceiver 510 and processing system 520. Transceiver 510 and processing system 520 communicate over link 540. Transceiver 510 communicates with wireless communication devices, omitted for clarity, over wireless link 550. Wireless access node 500 may be distributed among multiple devices that together form elements 510, 520-522, and 540. Transceiver 510 comprises radio frequency (RF) communication circuitry and an antenna. Transceiver 510 could also include amplifiers, filters, modulators, and signal processing circuitry.

Processing system 520 includes storage system 521. Processing system 520 retrieves and executes software 522 from storage system 521. In some examples, processing system 520 is located within the same equipment in which transceiver 510 is located. Storage system 521 could include a computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein.

Link 540 comprises a physical, logical, or virtual communication link, capable of communicating data, control signals, and communications, along with other information. In some examples, link 540 is encapsulated within the elements of transceiver 510 or processing system 520, and may be a software or logical link. In other examples, link 540 uses various communication media, such as air, space, metal, optical fiber, or some other signal propagation path, including combinations thereof. Link 540 could be a direct link or might include various equipment, intermediate components, systems, and networks. Wireless link 550 could use various protocols or communication formats as described herein for wireless links 120-122, including combinations, variations, or improvements thereof. In this example, wireless link 550 can exchange user communications and overhead communications with wireless communication devices, and can receive registration attempts from wireless communication devices.

Figure 6:
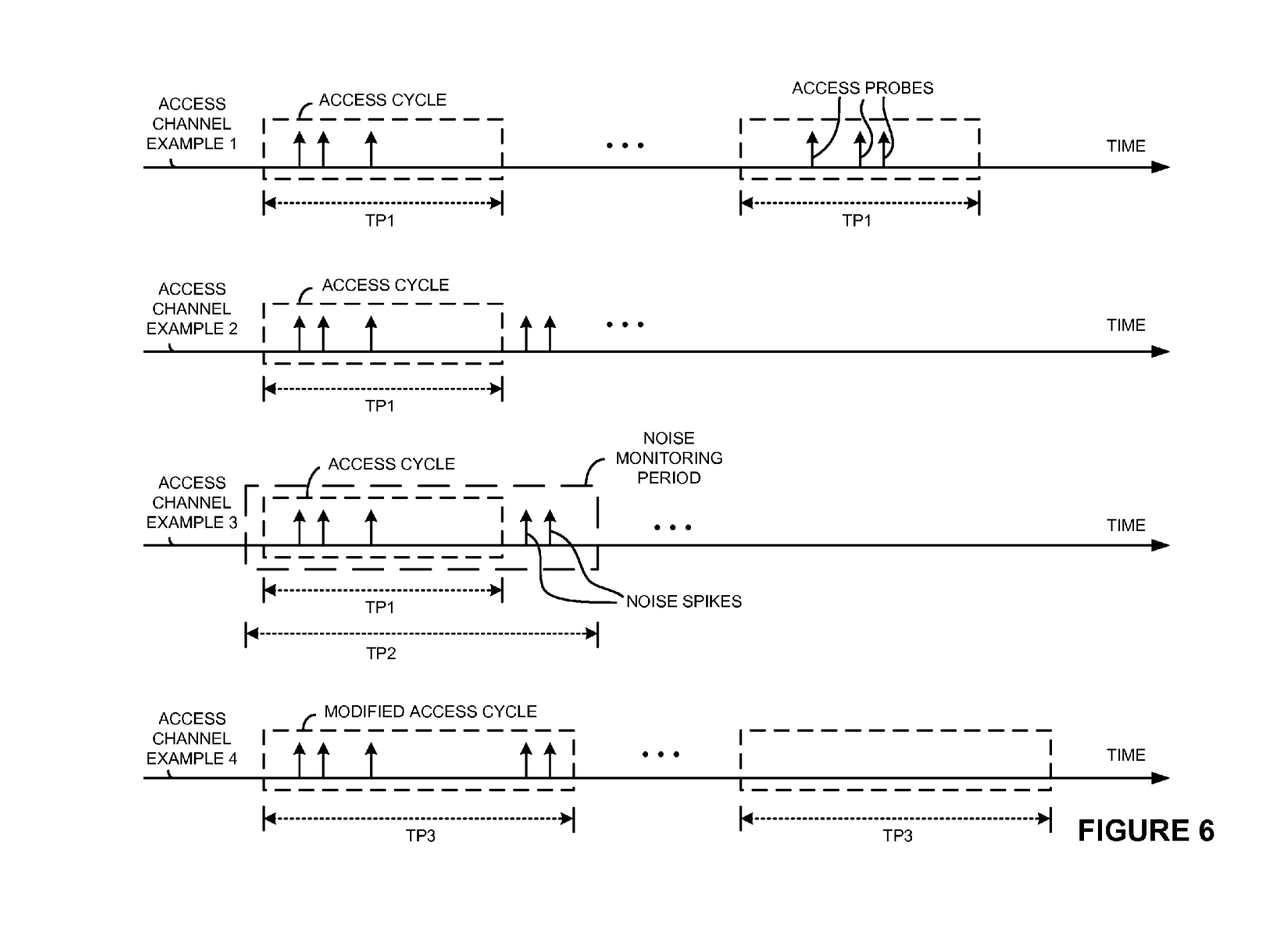
FIG. 6 is a diagram illustrating example wireless access channel configurations.

FIG. 6 is a diagram illustrating example wireless access channel configurations, as an example of an access channel of wireless access node 130 found in FIG. 1, or of base station 330 found in FIG. 3, other configurations could be utilized. FIG. 6 includes example access channels 1-4. In example access channel 1, an access cycle is illustrated as a repeating window of time during which a wireless access node monitors for access probes from wireless communication devices. The access cycle duration as shown in example access channel 1 is indicated by duration TP1, and is shown to be the same for each repeating occurrence of the access cycle. Also shown in example access channel 1 are three access probes occurring in the first access cycle and three access probes occurring in the second access cycle. Since all of the access probes of example access channel 1 occur during an access cycle, a wireless access node can properly detect and respond to the access probes.

Example access channel 2 in FIG. 6 illustrates where three access probes occur during the access cycle of duration TP1, and where two access probes occur outside of the access cycle. Further access cycles are omitted from example access channel 2 for clarity. Since the access probes outside of the access cycle do not occur during an access cycle, a wireless access node cannot properly detect and respond to the access probes outside of the access cycle. Therefore, in example access channel 3, a noise monitoring period is included. In many examples, access probes occurring outside of the access cycle can be interpreted as noise increases on the access channel, or noise spikes as shown in example access channel 3. In example access channel 3, the noise monitoring period is shown to of a larger period of time than the access channel, namely duration TP2. The noise monitoring period in example access channel 3 is then shown to encompass the time when two noise spikes occur outside of the access cycle. The time of occurrence of the noise spikes, as well as other factors, can be processed by a wireless access node to result in a modified access cycle duration, namely duration TP3 as shown in example access channel 4. Example access channel 4 thus illustrates where the access cycle duration has been increased, and is shown to encompass a longer duration TP3 which can now enable the wireless access node to detect access probes occurring outside of the original access cycle duration of TP1.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access node, wherein the wireless access node provides a wireless communication service to wireless communication devices after registration, the method comprising:

monitoring a wireless access channel of the wireless access node for registration attempts of the wireless communication devices during a first time period;

detecting an amount of noise above a threshold occurring on the wireless access channel after the first time period;

in response to detecting the amount of noise above the threshold, processing the first time period and data related to the amount of noise to determine a second time period;

in response to determining the second time period, monitoring the access channel for additional registration attempts of the wireless communication devices during the second time period.

2. The method of claim 1, wherein the data related to the amount of noise comprises a time of occurrence of the amount of noise relative to the first time period.

3. The method of claim 1, wherein the data related to the amount of noise comprises a peak level of the noise.

4. The method of claim 1, wherein the registration attempts comprise access probes transferred from individual ones of the wireless communication devices.

5. The method of claim 1, wherein the amount of noise occurring on the wireless access channel after the first time period comprises spikes in a reverse noise rise (RNR) as detected by the wireless access node.

6. The method of claim 1, wherein the amount of noise occurring on the wireless access channel after the first time period comprises registration attempts.

7. The method of claim 6, wherein the registration attempts comprise access probes transferred from individual ones of the wireless communication devices.

8. The method of claim 1, wherein the second time period is longer than the first time period.

9. The method of claim 1, further comprising:

while monitoring the access channel for the additional registration attempts of the wireless communication devices during the second time period, determining a portion of the second time period when the additional registration attempts do not occur;

in response to determining the portion of the second time period when the additional registration attempts do not occur, processing the second time period and the portion of the second time period when the additional registration attempts do not occur to determine a third time period;

in response to determining the third time period, monitoring the access channel for further additional registration attempts of the wireless communication devices during the third time period.

10. The method of claim 1, further comprising:

while monitoring the access channel for the additional registration attempts of the wireless communication devices during the second time period, determining if the additional registration attempts do not occur after the first time period;

if the additional registration attempts do not occur after the first time period, monitoring the access channel for further additional registration attempts of the wireless communication devices during the first time period.

11. A wireless access node, wherein the wireless access node provides a wireless communication service to wireless communication devices after registration, comprising:

a transceiver configured to monitor a wireless access channel of the wireless access node for registration attempts of the wireless communication devices during a first time period;

the transceiver configured to detect an amount of noise above a threshold occurring on the wireless access channel after the first time period;

in response to detecting the amount of noise above the threshold, a processing system configured to process the first time period and data related to the amount of noise to determine a second time period;

in response to determining the second time period, the transceiver configured to monitor the access channel for additional registration attempts of the wireless communication devices during the second time period.

12. The wireless access node of claim 11, wherein the data related to the amount of noise comprises a time of occurrence of the amount of noise relative to the first time period.

13. The wireless access node of claim 11, wherein the data related to the amount of noise comprises a peak level of the noise.

14. The wireless access node of claim 11, wherein the registration attempts comprise access probes transferred from individual ones of the wireless communication devices.

15. The wireless access node of claim 11, wherein the amount of noise occurring on the wireless access channel after the first time period comprises spikes in a reverse noise rise (RNR) as detected by the wireless access node.

16. The wireless access node of claim 11, wherein the amount of noise occurring on the wireless access channel after the first time period comprises registration attempts.

17. The wireless access node of claim 16, wherein the registration attempts comprise access probes transferred from individual ones of the wireless communication devices.

18. The wireless access node of claim 11, wherein the second time period is longer than the first time period.

19. The wireless access node of claim 11, comprising:

while the transceiver is monitoring the access channel for the additional registration attempts of the wireless communication devices during the second time period, the processing system is configured to determine a portion of the second time period when the additional registration attempts do not occur;

in response to determining the portion of the second time period when the additional registration attempts do not occur, the processing system is configured to process the second time period and the portion of the second time period when the additional registration attempts do not occur to determine a third time period;

in response to determining the third time period, the transceiver is configured to monitor the access channel for further additional registration attempts of the wireless communication devices during the third time period.

20. The wireless access node of claim 11, comprising:
while the transceiver is monitoring the access channel for the additional registration attempts of the wireless communication devices during the second time period, the processing system is configured to determine if the additional registration attempts do not occur after the first time period;
if the additional registration attempts do not occur after the first time period, the transceiver is configured to monitor the access channel for further additional registration attempts of the wireless communication devices during the first time period.

* * * * *